Dec. 9, 1952

G. O. HOFFSTETTER 2,620,916

COMBINED HOPPER AND DELIVERY CONVEYER

Filed April 19, 1948

Inventor
G. O. Hoffstetter
By Kimmel & Crowell
Attorneys

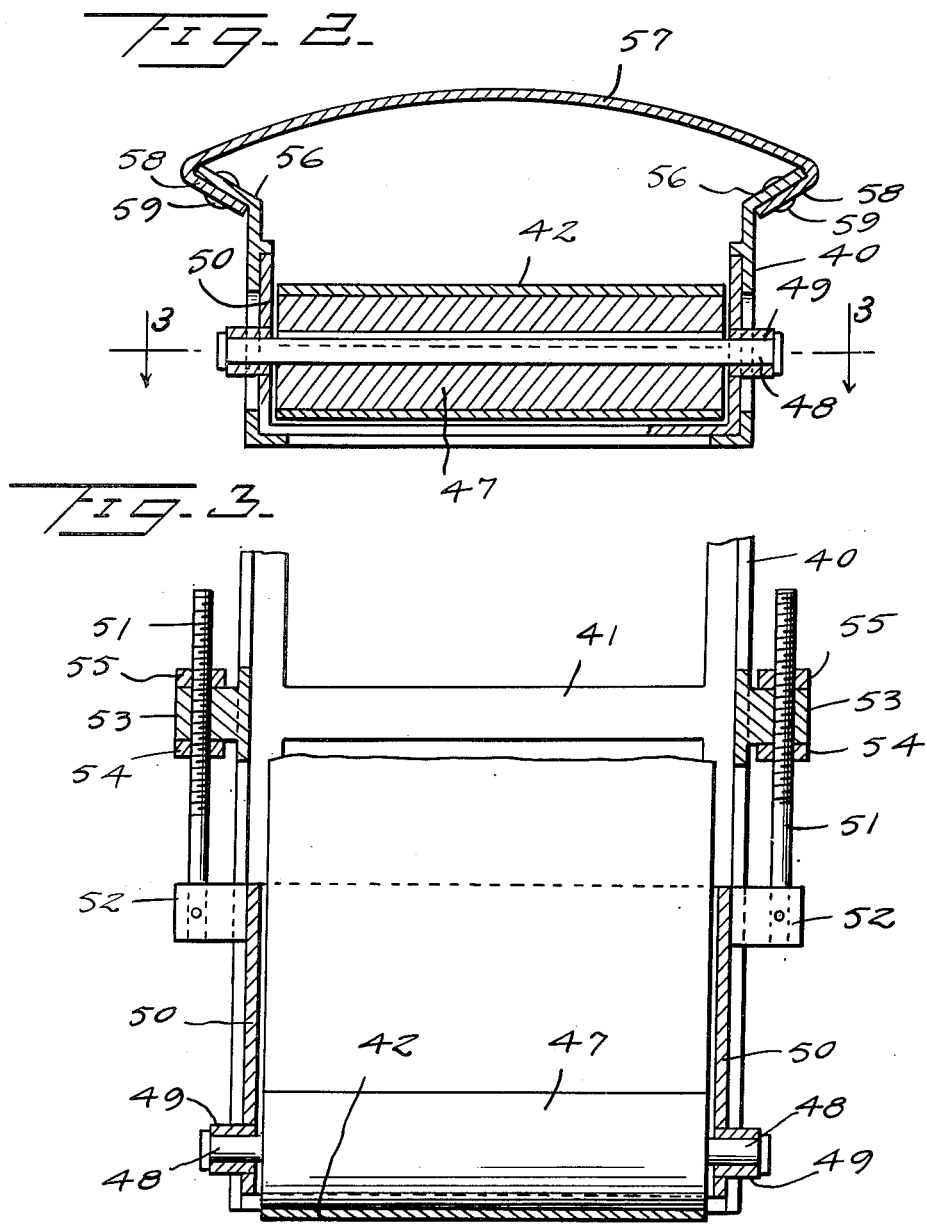

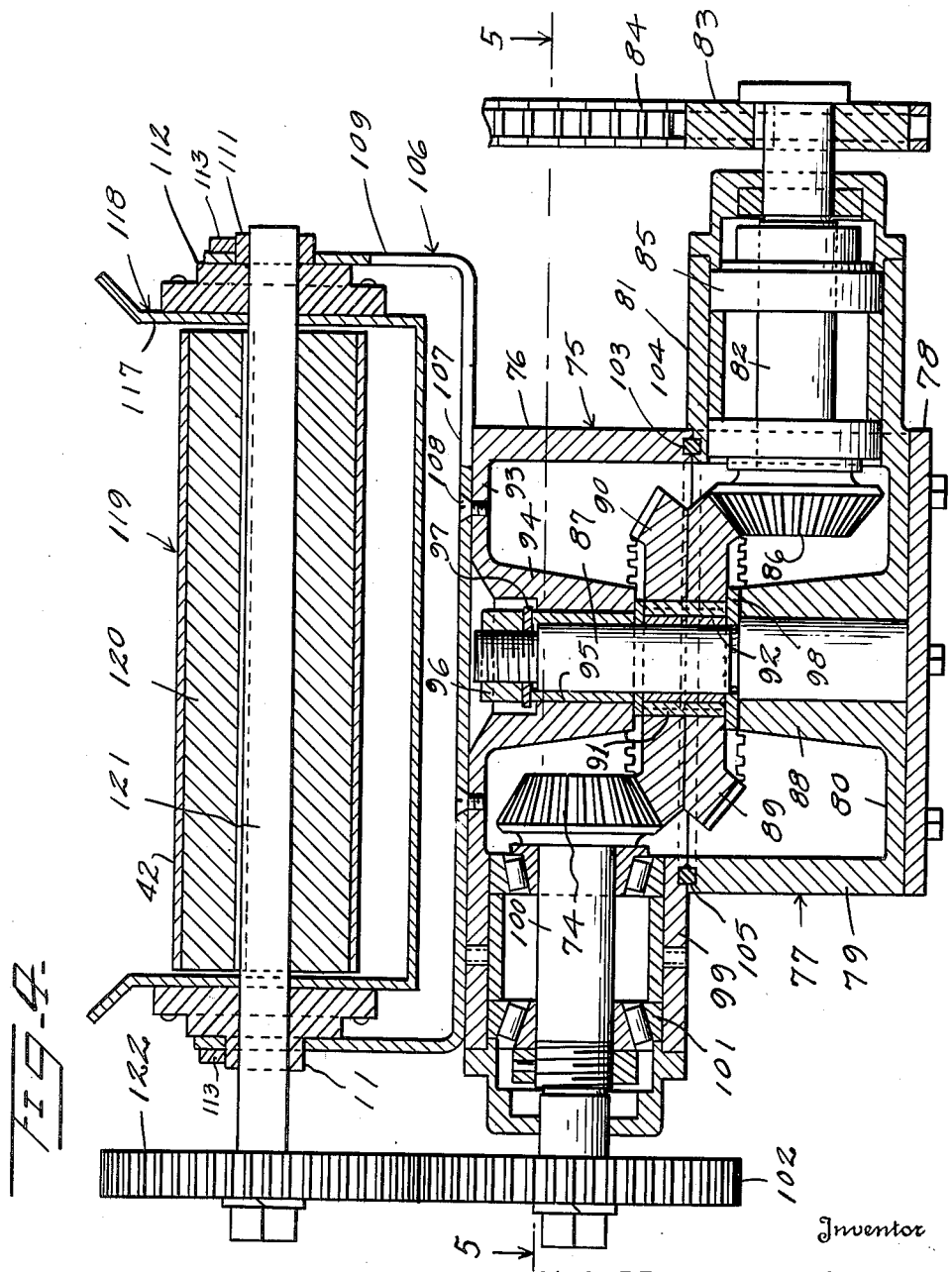

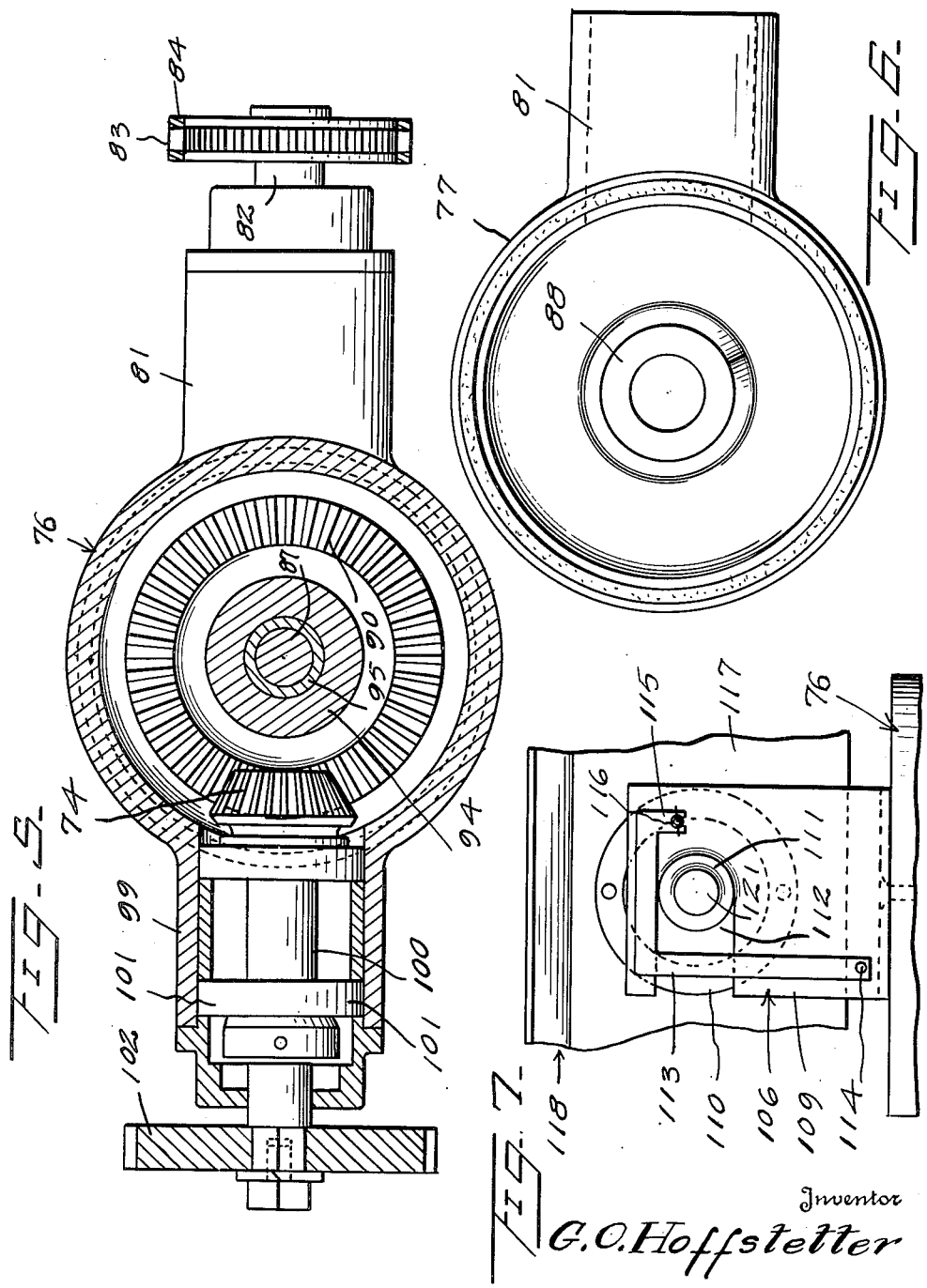

Patented Dec. 9, 1952

2,620,916

UNITED STATES PATENT OFFICE 2,620,916

COMBINED HOPPER AND DELIVERY CONVEYER

George O. Hoffstetter, Jerseyville, Ill.

Application April 19, 1948, Serial No. 21,775

2 Claims. (Cl. 198—58)

This invention relates to a conveyor for discharging material from the rear end of a hopper body.

An object of this invention is to provide in combination with a hopper body having a conveyor in the bottom thereof, a second conveyor for mounting on the rear of the hopper body and adapted to be adjusted in either or both horizontal and vertical planes so that the material may be delivered into a bin or other receiver remote from the hopper.

Another object of this invention is to provide a conveyor of this kind for mounting on a hopper body, including a crane or supporting means swingably fixed to the hopper for supporting the outer end of the conveyor so that the latter can be readily handled by one person.

A further object of this invention is to provide in combination, a hopper, a conveyor swingably and rockably carried by the hopper, and a crane or hoist swingably carried by the hopper and secured to the conveyor for supporting the conveyor in adjusted position relative to the vertical.

A further object of this invention is to provide an improved coupling means for a swingable conveyor whereby the conveyor is operatively coupled to the hopper discharge conveyor and at the same time is adapted to have substantially universal swinging movement relative to the hopper.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 2 is a sectional view taken on the line 2—2 of Figure 1.

Figure 3 is a fragmentary sectional view taken on the line 3—3 of Figure 2.

Figure 4 is a transverse vertical section taken on line 4—4 of Figure 1.

Figure 5 is a sectional view taken on the line 5—5 of Figure 4.

Figure 6 is a plan view of one of the gear housing members.

Figure 7 is a fragmentary side elevation showing the detachable connection between the delivery conveyor and the cradle.

Figure 1:
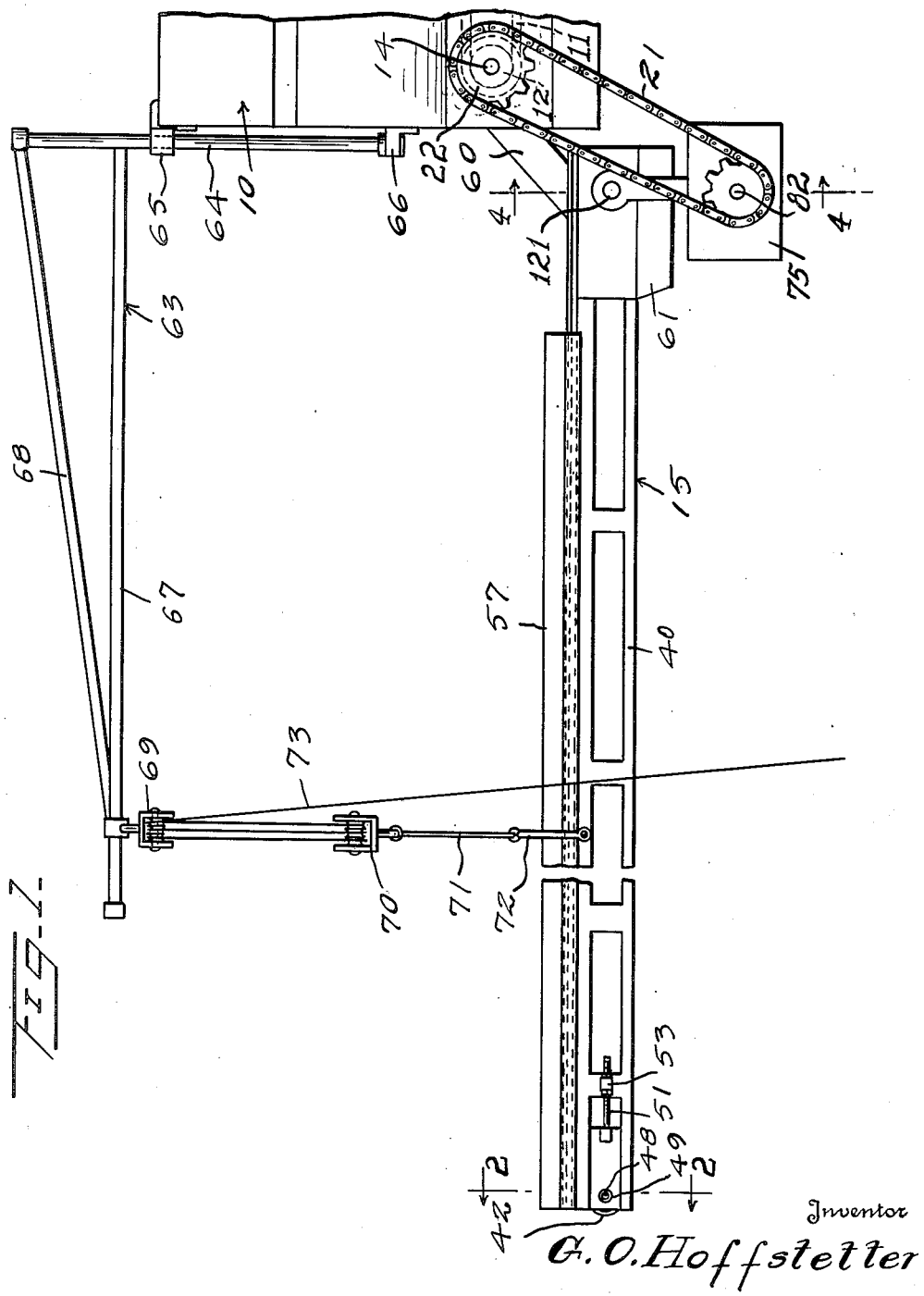
Figure 1 is a detailed side elevation, partly broken away of a discharge hopper with a delivery conveyor at the rear end thereof, constructed according to an embodiment of this invention.

Referring to the drawings, the numeral 10 designates generally a discharge hopper adapted to be mounted on a mobile chassis and the hopper 10 has disposed in the bottom thereof an endless conveyor 11 for moving and discharging the material from the hopper 10 through a discharge opening at the rear of the hopper 10. The conveyor 11 at the rear thereof is trained over a rear roller 12 carried by a shaft 14. A delivery conveyor structure generally designated as 15 is disposed at the rear of the hopper 10, extending rearwardly therefrom and is mounted for substantially universal swinging movement as will be hereinafter described.

The conveyor structure 15 includes an elongated frame formed of parallel side members 40 which are connected together at their lower edges by connecting bars 41. An endless conveyor 42 is disposed within the frame formed of the side members 40 and the connecting bars 41. The outer end of the conveyor 42 is trained about a forward or outer roller 47 mounted on a roller shaft 48 which is journalled in bearings 49. The bearings 49 are carried by a substantially U-shaped slide member 50 which is lengthwise movable at the outer or forward end of the frame and is adapted to be lengthwise adjusted by means of a pair of threaded adjusting bolts 51 fixed to blocks 52 carried by the slide 50.

The bolts 51 extend through stationary blocks 53 carried by the side members 40 and the bolts 51 are adjusted and locked in adjusted position by means of a pair of nuts 54 and 55 engaging on the opposite ends of the blocks 53. The side members 40 of the frame are formed at their upper edges with outwardly and upwardly inclined flanges 56 and a hood or cover 57 formed with returned flanges 58 is secured to the flanges 56 by fastening means 59. As shown in Figure 5, the hood or cover 57 is of transversely arcuate configuration being arched upwardly. The hood 57 provides a means whereby any dust generated by movement of the material over the conveyor 42 will be confined for discharge at the forward end of the conveyor.

The conveyor frame also includes a flared guide 60 secured to the rear of the frame between the side members 40 and extending upwardly and rearwardly to a position substantially beneath the discharge end of the discharge conveyor 11. The guide 60 is so constructed and arranged as to receive and guide the discharged material from conveyor 11 to conveyor 42 in substantially any angularly adjusted position of the conveyor structure 15. The rear ends of the side members 40 have secured thereto plates 61 formed with downwardly opening notches 62 which loosely and rockably engage over the bosses or bushings 38. In this manner the conveyor structure 15 will not only be rockably supported at its rear by the gear housing structure 16 but the conveyor structure may be easily and quickly lifted or replaced.

A crane or hoist structure generally designated as 63 is adapted to support the conveyor structure 15 in any angularly adjusted position of the latter. The crane or hoist structure 63 includes a vertically disposed post 64 rotatably carried by upper and lower bearings 65 and 66 which are fixed to the rear of the hopper 10.

The post 64 has fixed thereto and extending at right angles therefrom an elongated bar or pipe 67 braced by means of a bracing bar 68 connected between the outer portion of the bar 67 and the post 64. The bar 67 has secured to the outer portion thereof a sheave 69 and a second sheave 70 is connected with an intermediate portion of the conveyor structure 15 by means of connecting link 71 and a fork 72. A conveyor adjusting cable or rope 73 is trained over the sheaves 69 and 70.

Referring now to Figure 2, the numeral 75 designates generally a gear housing which is formed of an upper housing member or part 76 and a lower housing member or part 77 rotatable relative to each other. The lower housing member 77 is adapted to be fixedly secured by means of a bracket or supporting member 78 to the rear portion of the hopper as shown in Figure 1. The lower housing member 77 includes a cylindrical body 79 formed with a bottom wall 80 and a cylindrical bushing 81 extends from the cylindrical wall 79. A drive shaft 82 is journalled through the bushing 81 and has secured to the outer end thereof a sprocket 83 about which a sprocket chain 84 engages, the chain 84 being also trained over the sprocket 22 of the discharge conveyor shown in Figure 1.

The drive shaft 82 extends through a pair of anti-friction bearings 85 disposed in the bushing 81 and a bevel gear 86 is secured to the inner end of the drive shaft 82. A vertically disposed stationary shaft 87 extends upwardly from an upstanding bushing 88 carried by the bottom wall 80 of the lower housing member 77 being fixedly secured at its lower end in the bushing 88. A relatively large bevel gear 89 is rotatably disposed about the stationary shaft 87 and is coupled to a second large bevel gear 90 by means of a coupling sleeve 91.

A bearing bushing 92 is disposed within the coupling sleeve 91 and engages about the shaft 87. The upper housing member 76 includes a top wall 93 having a depending bushing 94 engaging about the upper portion of the stationary shaft 87. A bearing sleeve 95 is disposed in the bushing 94 and a nut 96 is threaded on the upper end of the shaft 87. A washer 97 is interposed between the nut 96 and the upper end of the bearing sleeve 95 and a thrust washer 98 is interposed between the lower end of bearing sleeve 92 and the upper end of bushing 88. The upper housing member 76 includes a laterally projecting bushing 99 through which a driven shaft 100 rotatably extends.

The shaft 100 is journalled through a pair of anti-friction bearings 101 disposed within the bushing 99 and has fixed to the inner end thereof a bevel gear 74 meshing with gear 90. A driven gear 102 is fixed on the outer end of driven shaft 100. The confronting ends of the housing members 76 and 77 are provided with complementary grooves 103 and 104 within which a ring 105 engages. The ring 105 may be a sealing ring being formed of compressing fiber or the like so as to provide an air-tight or oil-tight seal between the two relatively rotatable housing members. The top wall 93 of the upper housing member 76 has fixed thereto a U-shaped cradle 106 which has the bight 107 thereof secured by fastening means 108 to the top wall 93. The upstanding legs or sides 109 of the cradle 106 are formed with horizontally extending slots 110 within which the reduced bearing portions 111 of bearing members 112 are adapted to loosely engage.

The bearing portions 111 are adapted to be locked in the slots 110 by means of a pair of inverted substantially L-shaped locking members 113 which are connected together by means of a connecting rod 114. The locking members 113 include a depending extension 115 which may be secured in locked position by means of a wing bolt 116 threaded into the adjacent upstanding side member 109. The bearing 112 is secured to the vertical side 117 of the elongated delivery conveyor frame 15 and the endless conveyor 119 is disposed within and extends lengthwise of the frame 118. A driving drum or roller 120 of the conveyor 119 is secured to a conveyor shaft 121 which extends through the bearings 112 and a gear 122 is fixed on one end of the shaft 121 and is adapted to mesh with the driven gear 102 when the delivery conveyor structure is engaged on the cradle 106. The conveyor frame 118 is mounted for vertical rocking movement in the cradle 106 and the cradle 106 with the delivery conveyor engaged therewith is adapted to swing about the vertical axis of shaft 87. In this manner the delivery conveyor will be provided with substantially universal swinging movement or adjustment.

In the use and operation of this device the material which is to be delivered is moved to the rear of the discharge hopper 10 by movement of the discharge conveyor 11. The delivery conveyor structure 15 may be angularly adjusted in any horizontal or vertical position by means of the crane or hoist structure 73 and manual swinging of the outer end of the conveyor structure. With movement of conveyor 11, conveyor 42 would also be moved so that the discharged material will slide down the guide or chute 60 onto conveyor 42 and will then be discharged from the outer or forward end of conveyor 42. When the truck on which the hopper body 10 is mounted is being moved over the road to the point of delivery of the material, the conveyor structure 15 is detached from the gear structure 16 by raising the conveyor structure and disconnecting the rear end thereof from the pivotal bosses 38. The conveyor structure may then be mounted on the side of the hopper structure 10 or at any other convenient location. The conveyor structure herein disclosed embodies an endless conveyor 42 but it will, of course, be understood that this conveyor structure may, if desired, be a screw conveyor.

I claim:

1. In combination a hopper having a discharge opening at one end thereof, a discharge conveyor in the bottom of said hopper, an elongated conveyor frame, a conveyor carried by said frame, a gear housing, means supporting said housing from said one end of said hopper, said housing including a stationary lower member and an upper member swingable about a vertical axis, an operative connection between said lower member and said first conveyor, an operative connection between said upper member and said second conveyor, and means rockably supporting said frame from said upper member, said latter named means including a pair of slotted plates fixed to said frame, and means carried by said upper member engageable in said slots.

2. In a hopper having a discharge means for discharging material from one end thereof, a gear housing at said one end of said hopper, said housing including a stationary lower part and a rotatable upper part disposed on a vertical axis, a horizontal drive shaft carried by said lower part, an operative connection between said drive shaft and said discharge means, a horizontal driven shaft carried by said upper part, gears connecting said drive and driven shafts together, a driven gear carried by said driven shaft, a cradle carried by said upper part, a delivery conveyor including a conveyor shaft, a gear on said conveyor shaft, and means detachably mounting one end of said delivery conveyor on said cradle in a position whereby said latter named gear will mesh with said driven gear.

GEORGE O. HOFFSTETTER.

REFERENCES CITED

The following references are of record in the file of this patent:

UNITED STATES PATENTS

| Number | Name | Date |
| --- | --- | --- |
| 252,623 | Reeves | Jan. 24, 1882 |
| 305,979 | Starr | Sept. 30, 1884 |
| 706,395 | De Jong | Aug. 5, 1902 |
| 947,592 | Gilman | Jan. 25, 1910 |
| 1,446,124 | Lichtenberg | Feb. 20, 1923 |
| 1,476,634 | Neighbour | Dec. 4, 1923 |
| 2,038,471 | Benatar | Apr. 21, 1936 |
| 2,107,682 | Wall | Feb. 8, 1938 |
| 2,488,407 | Hoffstetter | Nov. 15, 1949 |